(12) United States Patent
Watts (10) Patent No.: US 8,950,195 B2
(45) Date of Patent: Feb. 10, 2015

(54) CONTINUOUS FLOW THERMODYNAMIC PUMP

(75) Inventor: Daniel A. Watts, Surfside, CA (US)

(73) Assignee: The Boeing Company, Chicago, IL (US)

( * ) Notice: Subject to any disclaimer, the term of this patent is extended or adjusted under 35 U.S.C. 154(b) by 1089 days.

(21) Appl. No.: 12/972,428

(22) Filed: Dec. 18, 2010

(65) Prior Publication Data

US 2012/0156059 A1    Jun. 21, 2012

(51) Int. Cl.
*F17C 9/02* (2006.01)
*F17C 3/10* (2006.01)
*F17C 5/06* (2006.01)

(52) U.S. Cl.
CPC ... *F17C 5/06* (2013.01); *F17C 9/02* (2013.01); *Y02E 60/321* (2013.01)
USPC .............................................. 62/50.2; 62/48.2

(58) Field of Classification Search
CPC ............... F17C 5/02; F17C 6/00; F17C 7/02; F17C 7/04; F17C 9/02; F17C 9/04; F17C 13/002; F17C 13/04; F17C 2205/0134; F17C 2205/0142; F17C 2205/0146; F17C 2221/012; F17C 2223/0161; F17C 2223/01; F17C 2223/0123; F17C 2227/01; F17C 2227/04; F17C 2227/041; F17C 2227/047; Y02E 60/321; Y02E 60/34
USPC ...................... 62/50.1, 50.2, 50.4, 50.6, 49.2
See application file for complete search history.

(56) References Cited

U.S. PATENT DOCUMENTS

| | | | | | |
|---|---|---|---|---|---|
| 5,329,777 | A | * | 7/1994 | Weltmer, Jr. | 62/49.2 |
| 5,454,408 | A | * | 10/1995 | DiBella et al. | 141/197 |
| 7,219,682 | B2 | * | 5/2007 | Agnew et al. | 137/1 |
| 7,257,940 | B1 | * | 8/2007 | Knight | 60/259 |
| 2010/0139777 | A1 | * | 6/2010 | Whiteman | 137/14 |
| 2010/0287955 | A1 | | 11/2010 | Watts | |

* cited by examiner

*Primary Examiner* — John F Pettitt
*Assistant Examiner* — Ignacio E Landeros
(74) *Attorney, Agent, or Firm* — Felix L. Fischer (57) ABSTRACT

A thermodynamic pump for provides gaseous hydrogen employing a plurality of liquid hydrogen (LH2) tanks sequentially pressurized with gaseous hydrogen (GH2) from an accumulator. A heat exchanger receiving LH2 from each of the plurality of tanks as sequentially pressurized returns pressurized GH2 to the accumulator for supply to an engine.

6 Claims, 16 Drawing Sheets

CONTINUOUS FLOW THERMODYNAMIC PUMP

BACKGROUND INFORMATION

1. Field

Embodiments of the disclosure relate generally to cryogenic pumping systems and more particularly to embodiments for a system employing multiple thermodynamic pumping chambers sequentially receiving cryogenic liquid from a tank and interconnected though a heat exchanger to a gas supply tank for continuous gas supply.

2. Background

The use of liquid hydrogen, LH2, for higher density storage and the conversion of LH2 to gaseous hydrogen (GH2) for use in reciprocating and other internal combustion engines is a growing requirement. As an exemplary use, the need for high altitude long endurance (HALE) type Unmanned Aerial Vehicles with large reciprocating engines is growing exponentially and may soon reach 3,000 vehicles per year. Use of hydrogen for fueling these vehicles has been demonstrated as an efficient and environmentally friendly solution. However, reasonable storage densities for hydrogen can only be achieved with cryogenic storage as a liquid. Each vehicle will have a need for a LH2 hydrogen pump and GH2 conversion system. Without a suitable pump, the vehicle will not be able to meet the long endurance requirements of HALE vehicles. Reliable continuous flow of GH2 for the engine is a necessity.

Prior mechanical LH2 pumping systems supplying liquid to conventional heat exchangers for conversion to gas, such as those used in rocket fueling systems, have proved complex and insufficiently reliable for extended usage. Unlike rocket systems which deplete their fuel within a matter of seconds or minutes, applications such as HALE require continuous GH2 supply for days or longer. Additionally, reusability of the system without extraordinary refurbishment requirements is needed.

It is therefore desirable to provide and LH2 pumping system which has simplified mechanical requirements while providing continuous flow for GH2 conversion over an extended period.

SUMMARY

Embodiments disclosed herein provide a thermodynamic pump for providing gaseous hydrogen. The pump employs a plurality of liquid hydrogen (LH) tanks sequentially pressurized with gaseous hydrogen (GH2) from an accumulator. A heat exchanger receiving LH2 from each of the plurality of tanks as sequentially pressurized returns pressurized GH2 to the accumulator for supply to an engine.

In operation, the embodiments provide a method for alternatingly connecting one of multiple liquid hydrogen tanks through a boost pump with an accumulator containing hydrogen gas providing a continuous flow of hydrogen gas to an engine.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
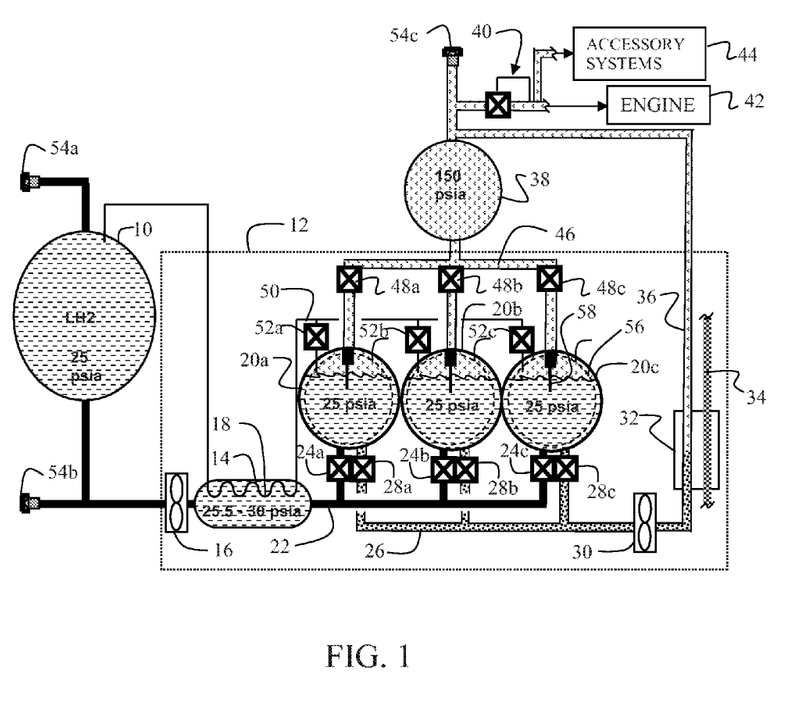
FIG. 1 is a schematic diagram of the elements of a LH2 storage and GH2 supply system employing an embodiment of the thermodynamic pump.

Referring to FIG. 1, the embodiments described herein demonstrate a system for storage of LH2 and supply of GH2 by a thermodynamic pump to an engine and/or other accessory systems through a proportional flow control device. For an exemplary embodiment, a LH2 storage dewar 10 stores LH2 for the system. While one dewar is shown, multiple dewars may be employed for alternative embodiments requiring additional LH2 storage capability. A thermodynamic pump (TDP) 12 incorporates a LH2 transfer accumulator and return GH2 condenser 14 receiving LH2 from dewar 10 through a first boost pump 16 and returning GH2 to the dewar through a first heat exchanger 18 in the accumulator condenser. Multiple TDP tanks shown for the embodiment described as spheres 20a, 20b and 20c receive LH2 from the LH2 transfer accumulator through a liquid fill manifold 22 having inlet valves 24a, 24b and 24c into the respective spheres. Each sphere provides LH2 to a liquid supply manifold 26 through supply valves 28a, 28b and 28c, respectively.

A second boost pump 30 induces liquid flow through the supply manifold to a heat exchanger 32 incorporating a hot working fluid line 34 flowing into and through heat exchanger 32, typically from an engine coolant system, and a LH2 to GH2 conversion line 36 flowing into and through heat exchanger 32. Gas in the GH2 conversion line is provided to a GH2 accumulator 38, which provides interim GH2 storage for supply through proportional flow control device (PFCD) 40 to an engine 42 such as a reciprocating internal combustion engine for a HALE air vehicle application. GH2 may also be supplied by the PFCD to other accessory systems 44 such as a fuel cell for electrical power generation to supplement mechanical power generated by the engine.

A GH2 pressurization manifold 46 interconnects GH2 accumulator 38 to ullage in each of the TDP spheres through pressurization valves 48a, 48b and 48c for operational pressurization of the spheres as will be described in greater detail subsequently. A blow down manifold 50 connected to the TDP spheres through depressurization valves 52a, 52b and 52c returns GH2 to GH2 condenser 14 for return to LH2 dewar 10 also to be described in greater detail subsequently.

Quick disconnects 54a and 54b are provided for ground service equipment (GSE) attachment to the LH2 dewar for LH2 fill and detanking, if required, and quick disconnect (QD) 54c is provided for GH2 flow to/from the GH2 accumulator to GSE during fill operations.

Figure 2:
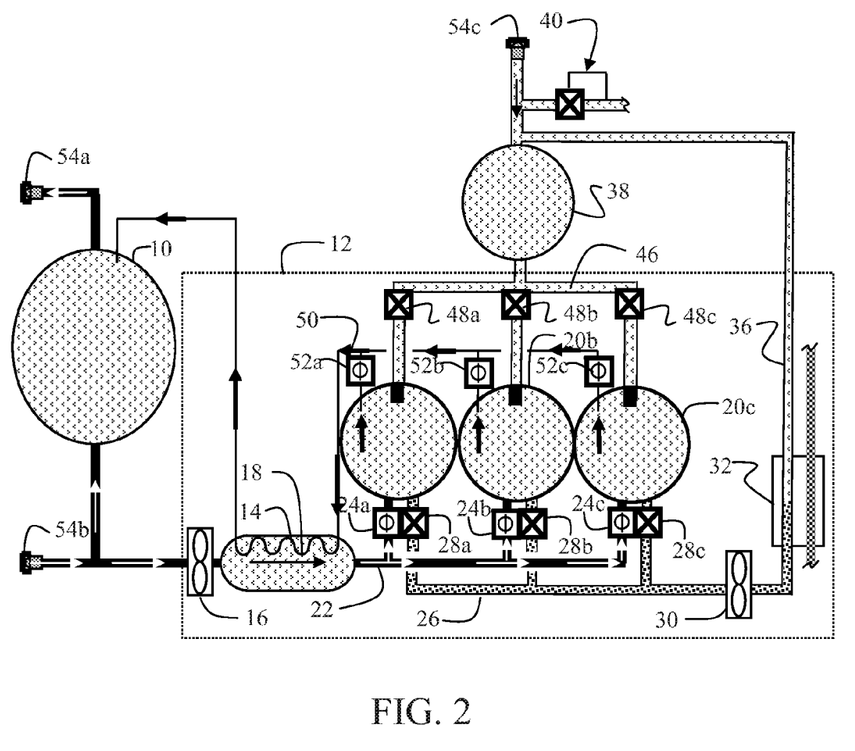
FIGS. 2-16 demonstrate the operation of the thermodynamic pump to provide continuous GH2 supply.
Figure 3:
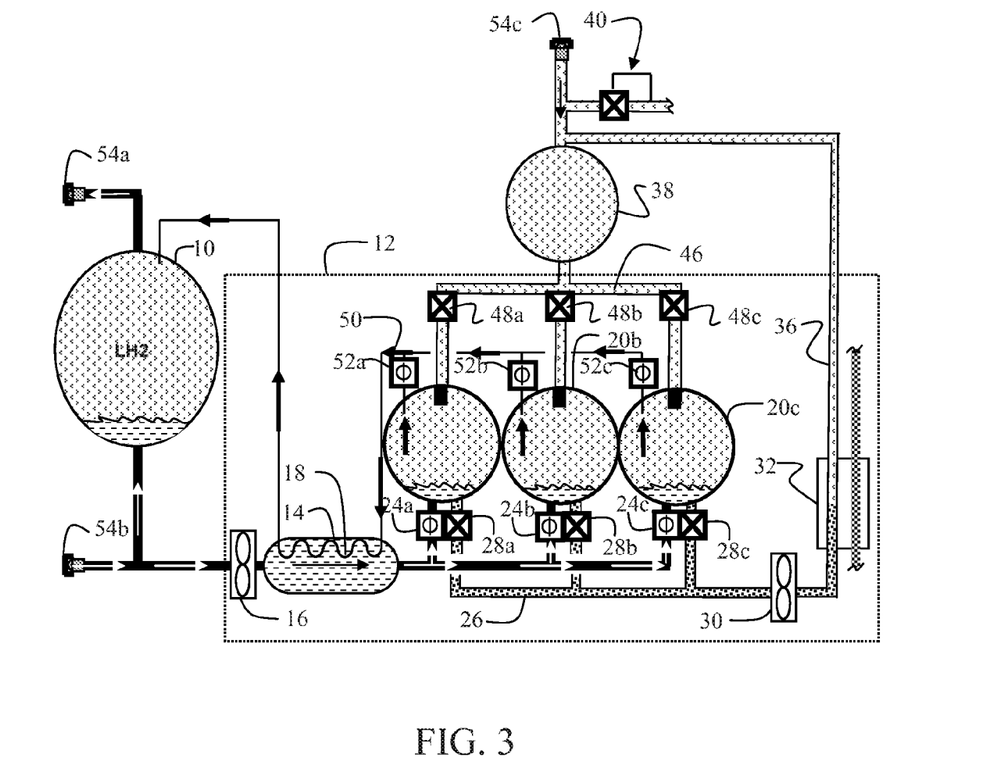

FIGS. 2-16 demonstrate the operation of storage and supply system using the TDP pump 12. In FIG. 2, filling of the system for operation is accomplished by flowing LH2 as represented by the arrows from GSE through QD 54b into dewar 10, accumulator 14 and through fill manifold 22 and open fill valves 24a, 24b and 24c through the TDP spheres exiting through open depressurization valves 52a, 52b and 52c into the depressurization manifold through condenser 18 into the dewar and vented through QD 54a back to the GSE. FIG. 2 shows the system with cold GH2 resulting from flash vaporizing of the LH2 flowing through the system during cool down. After sufficient cool down of the system, liquid fill with LH2 commences as shown in FIG. 3. Those skilled in the art will recognize that a preliminary flow of inert gas such as helium followed by gaseous hydrogen may precede LH2 flow. Concurrently with LH2 fill of the dewar and TDP spheres, GH2 charging of GH2 accumulator 38 through QD 54c is accomplished. For the exemplary embodiment, an operating GH2 pressure of about 150 psia is employed.

Figure 4:
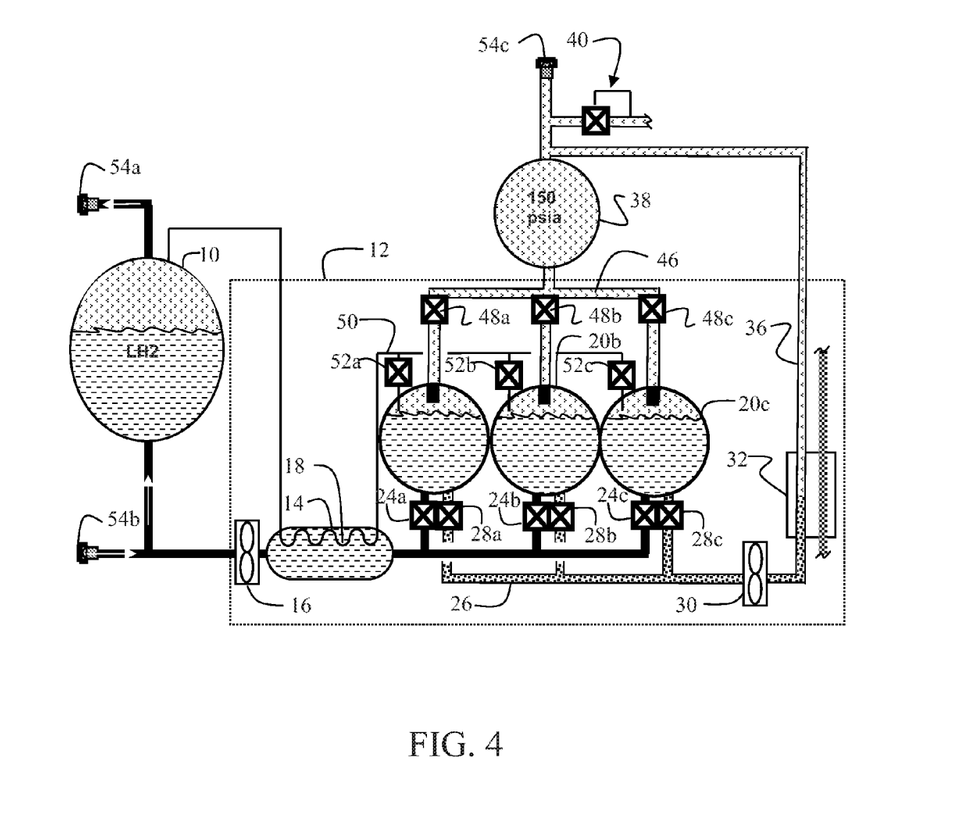
Figure 5:
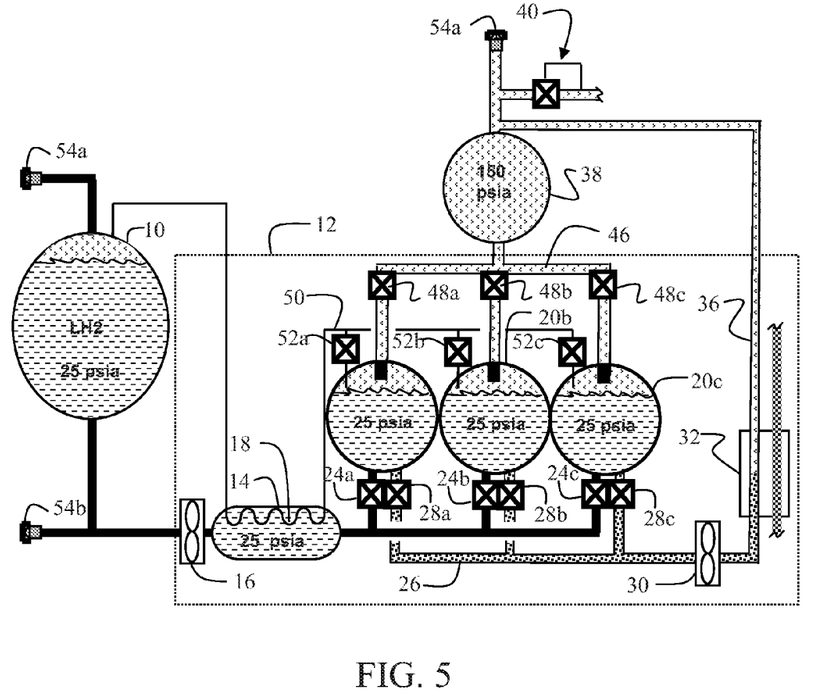

As shown in FIG. 4, upon completion of filling the TDP spheres, fill valves 24a, 24b and 24c are closed. Fill of the LH2 dewar continues until full as shown in FIG. 5 at which time the GSE may be disconnected and the system is ready for operation. In certain embodiments, valving to complete fill of the LH2 dewar prior to completion of the TDP spheres may be required for operational considerations.

Figure 6:
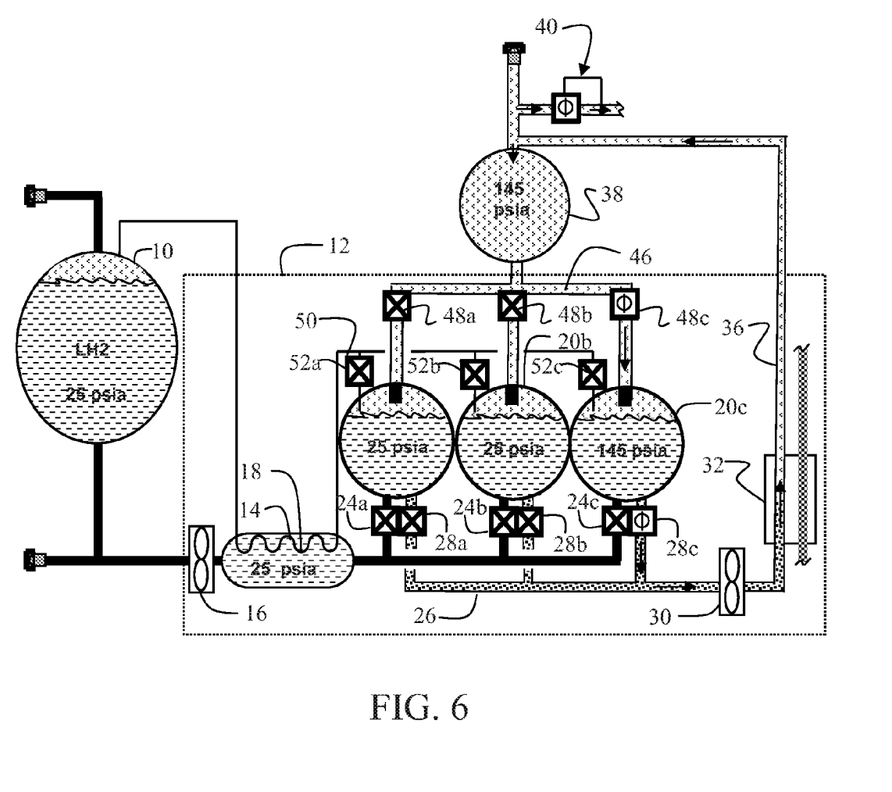
Figure 7:
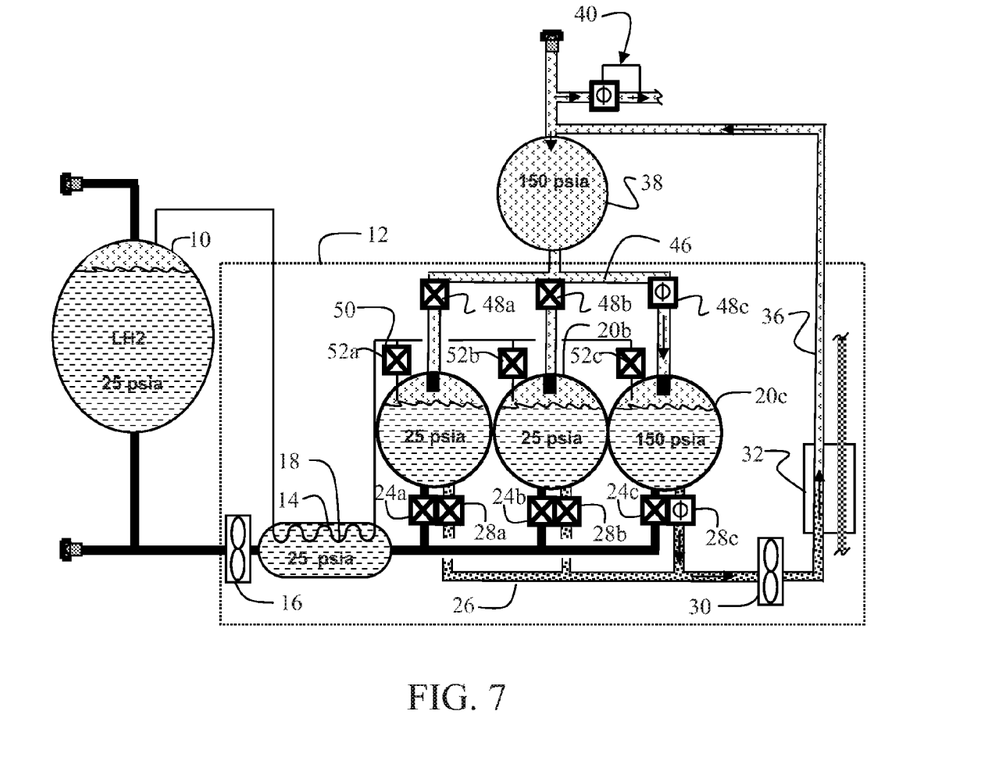

As shown in FIG. 6, operation of TDP 12 commences with opening of pressurization valve 48c introducing GH2 pressure from the GH2 accumulator into TDP sphere 20c. Thermal contraction of the gas results in a minor reduction in gas pressure of approximately 5 psia to 145 psia as shown. Opening of supply valve 28c provides LH2 flow from TDP sphere 20c into supply manifold 26 assisted by boost pump 30. LH2 flows through heat exchanger 32 gasifying the LH2 into GH2 and flowing to accumulator 38 for supply through PFCD 40 to use by the engine and/or other accessory systems. Flow through heat exchanger 32 increases operating pressure in the accumulator and TDP sphere 20c to nominal at 150 psia as shown in FIG. 7. In the exemplary embodiments, a pressure regulator (not shown) maintains the nominal pressure of 150 psia in the accumulator. Pressures in the remaining two TDP spheres, 20b and 20a as well as the LH2 dewar and accumulator 14 remain nominally at 25 psia.

Figure 8:
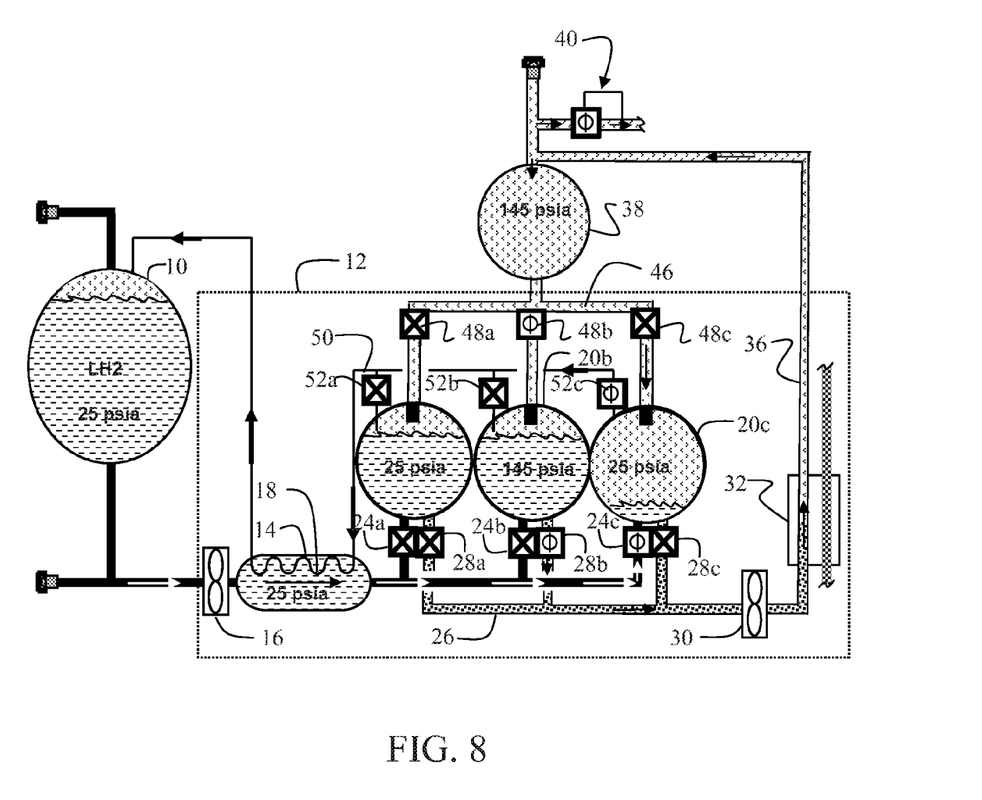

When TDP sphere 20c is substantially depleted of LH2, as shown in FIG. 8, pressurization valve 48c is closed and supply valve 28c is closed. Pressurization valve 48b is opened pressurizing TDP sphere 20b, with the gas pressure fluctuation to 145 psia as shown, and supply valve 28b is opened providing LH2 flow from TDP sphere 20b to the supply manifold and through pump 30 to heat exchanger 32 to accumulator 38. Fill valve 24c and depressurization valve 52c are opened to commence refilling of TDP sphere 20c.

Figure 9:
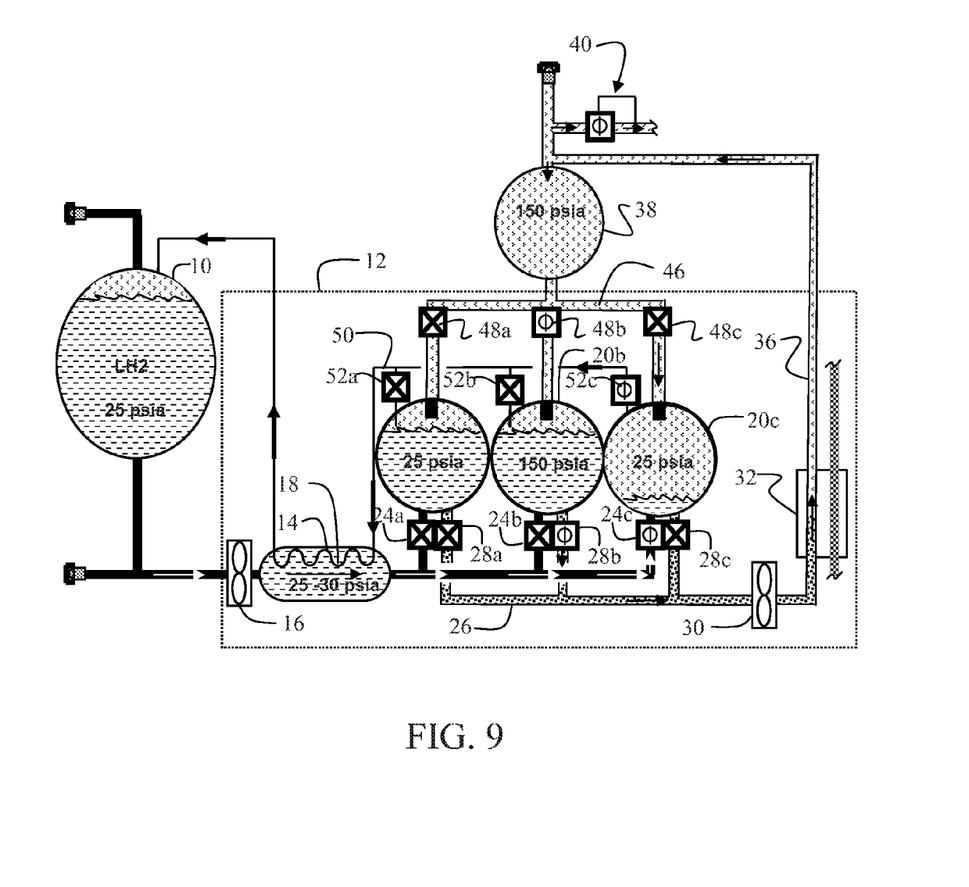
Figure 10:
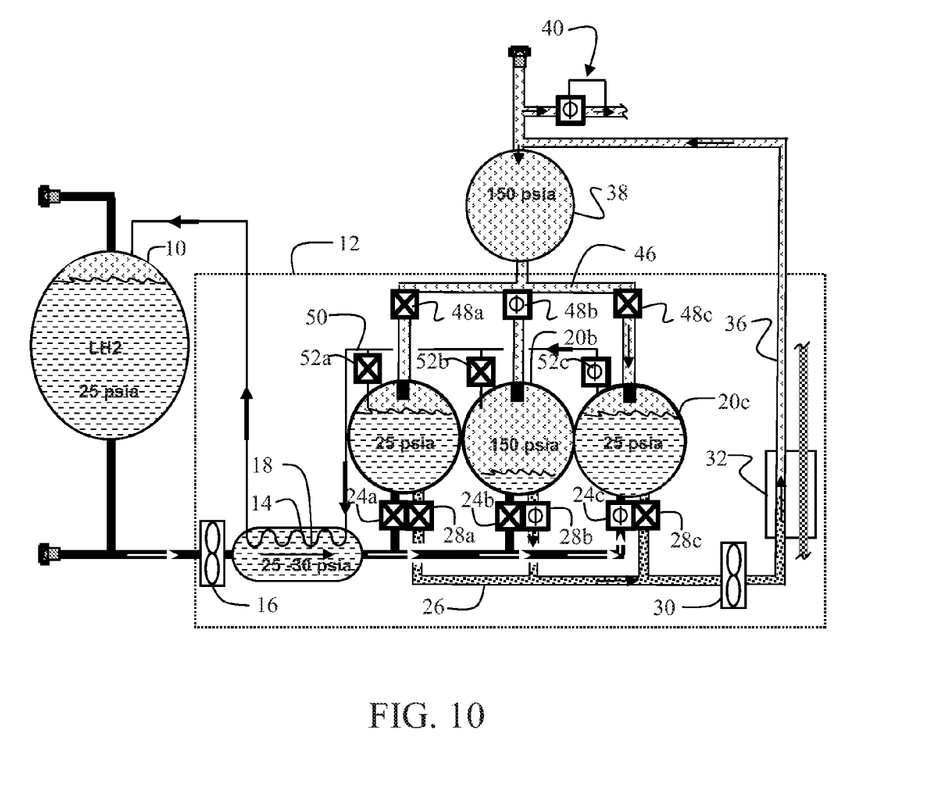

As shown in FIG. 9, flow through heat exchanger 32 increases operating pressure in the accumulator and TDP sphere 20b allowing pressure recovery to 150 psia is achieved in TDP sphere 20b and accumulator 38. Depressurization of TDP sphere 20c to approximately 25 psia for fill with flow through blow down manifold 50 and heat exchanger 18 and back into the LH2 dewar 10 results in a slight pressure increase in accumulator and condenser 14 of between 25 to 30 psia. LH2 flow from the dewar at 25 psia assisted by boost pump 16 fills TDP sphere 20c as TDP sphere 20b is being depleted as shown in FIG. 10. For the embodiment shown, LH2 saturation temperature and pressure results in the 25 psia dewar pressure. In alternative systems, alternate pressures and temperatures may be employed.

Figure 11:
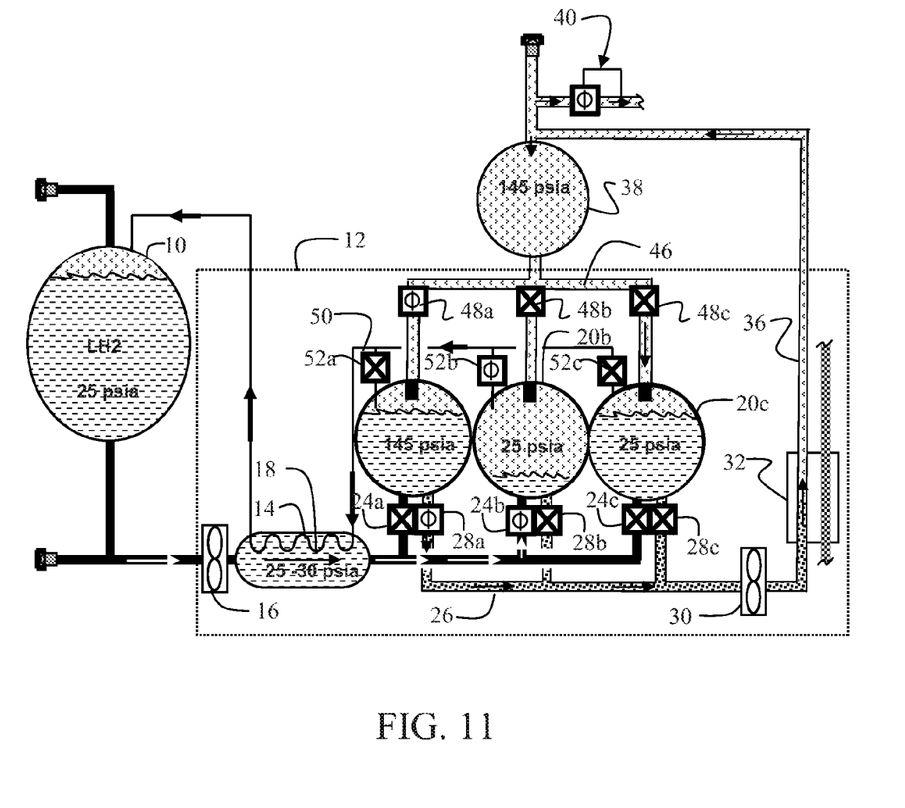

When TDP sphere 20b is substantially depleted of LH2, as shown in FIG. 11, pressurization valve 48c is closed and supply valve 28b is closed. Pressurization valve 48a is opened pressurizing TDP sphere 20a, with the gas pressure fluctuation to 145 psia as shown, and supply valve 28ab is opened providing LH2 flow from TDP sphere 20a to the supply manifold and through pump 30 to heat exchanger 32 to accumulator 38. Fill valve 24b and depressurization valve 52b are opened to commence refilling of TDP sphere 20b.

Figure 12:
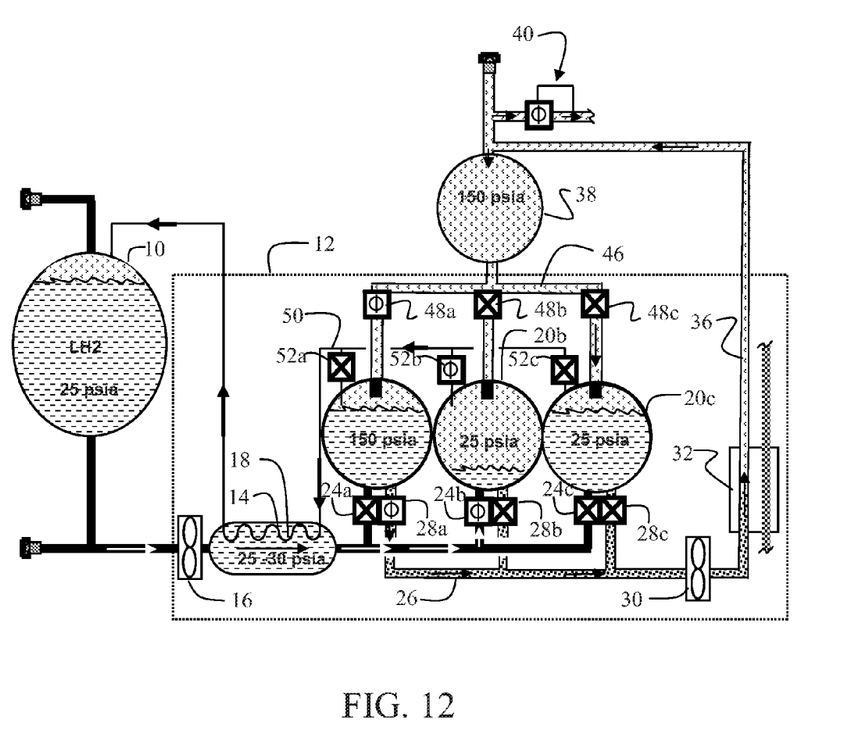
Figure 13:
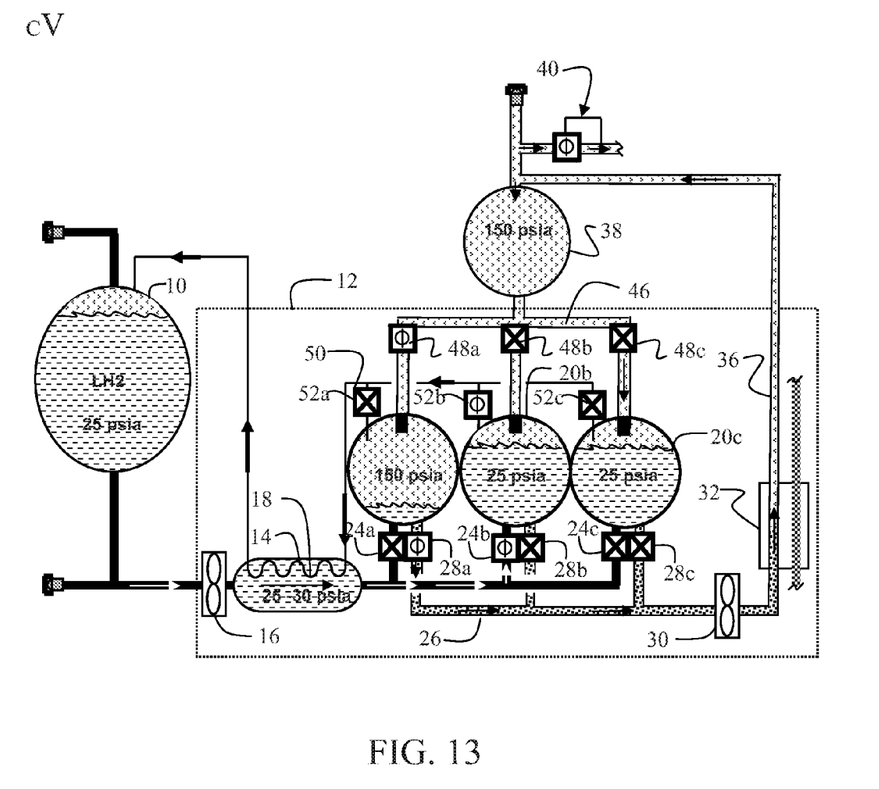

As shown in FIG. 12, pressure recovery to 150 psia is achieved in TDP sphere 20a and accumulator 38. Depressurization of TDP sphere 20b to approximately 25 psia for fill with flow through blow down manifold 50 and heat exchanger 18 and back into the LH2 dewar 10 maintains the slight pressure increase in accumulator and condenser 14 of between 25 to 30 psia. LH2 flow from the dewar assisted by boost pump 16 fills TDP sphere 20b as TDP sphere 20a is being depleted as shown in FIG. 13.

Figure 14:
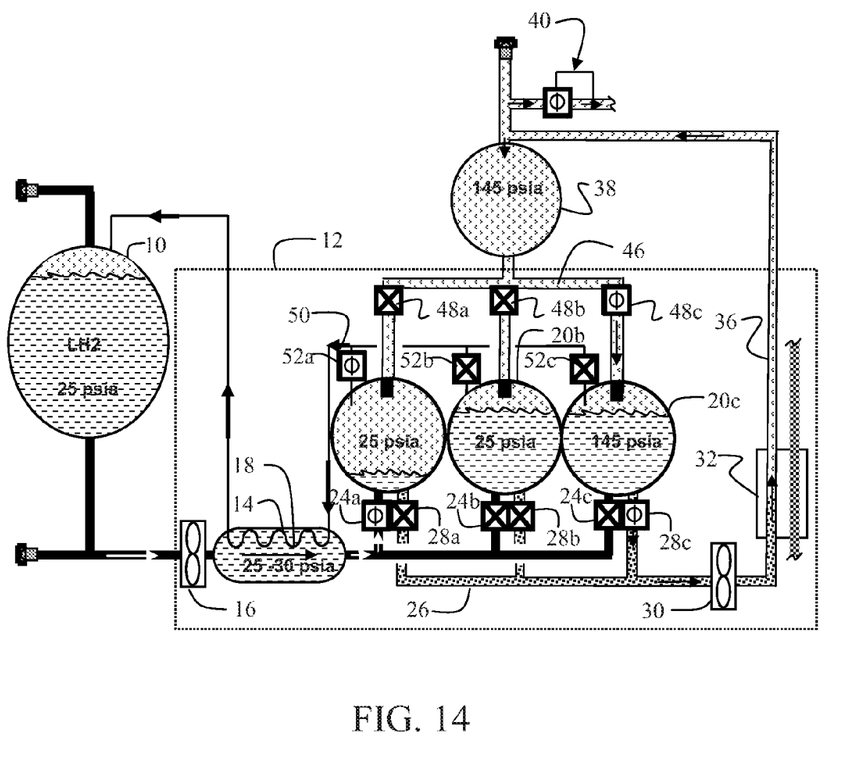

When TDP sphere 20a is substantially depleted of LH2, as shown in FIG. 14, pressurization valve 48a is closed and supply valve 28a is closed. Pressurization valve 48c is opened pressurizing TDP sphere 20c, with the gas pressure fluctuation to 145 psia as shown, and supply valve 28c is opened providing LH2 flow from TDP sphere 20c to the supply manifold and through pump 30 to heat exchanger 32 to accumulator 38. Fill valve 24a and depressurization valve 52a are opened to commence refilling of TDP sphere 20a.

Figure 15:
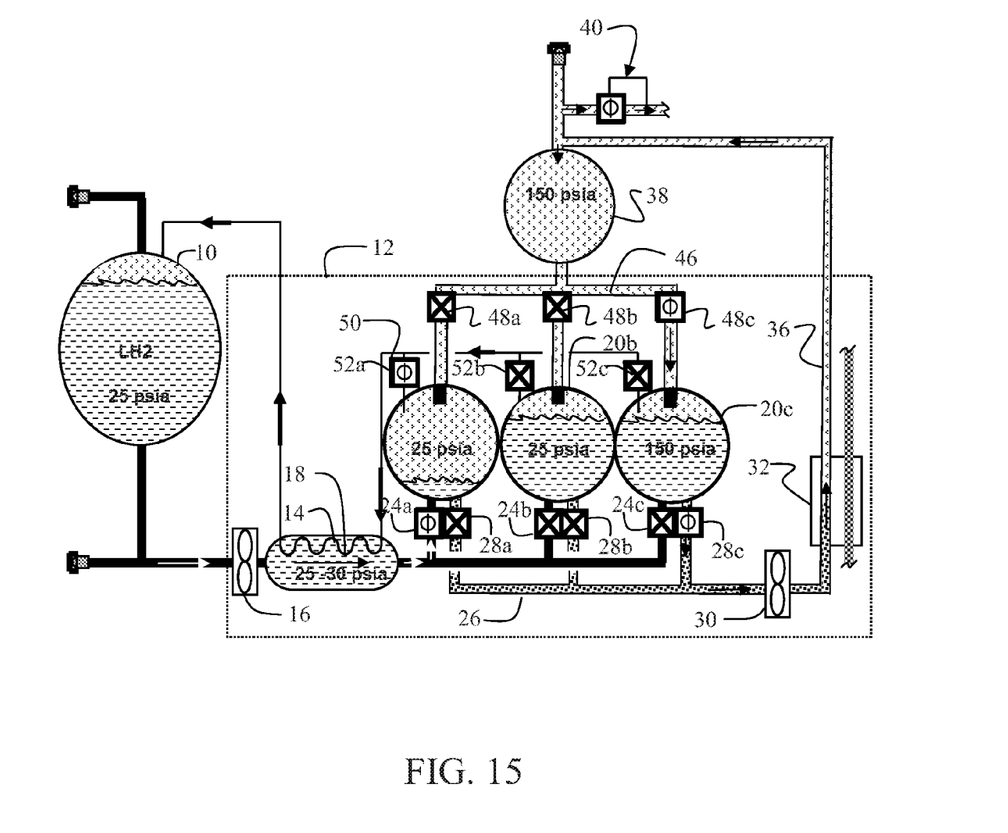
Figure 16:
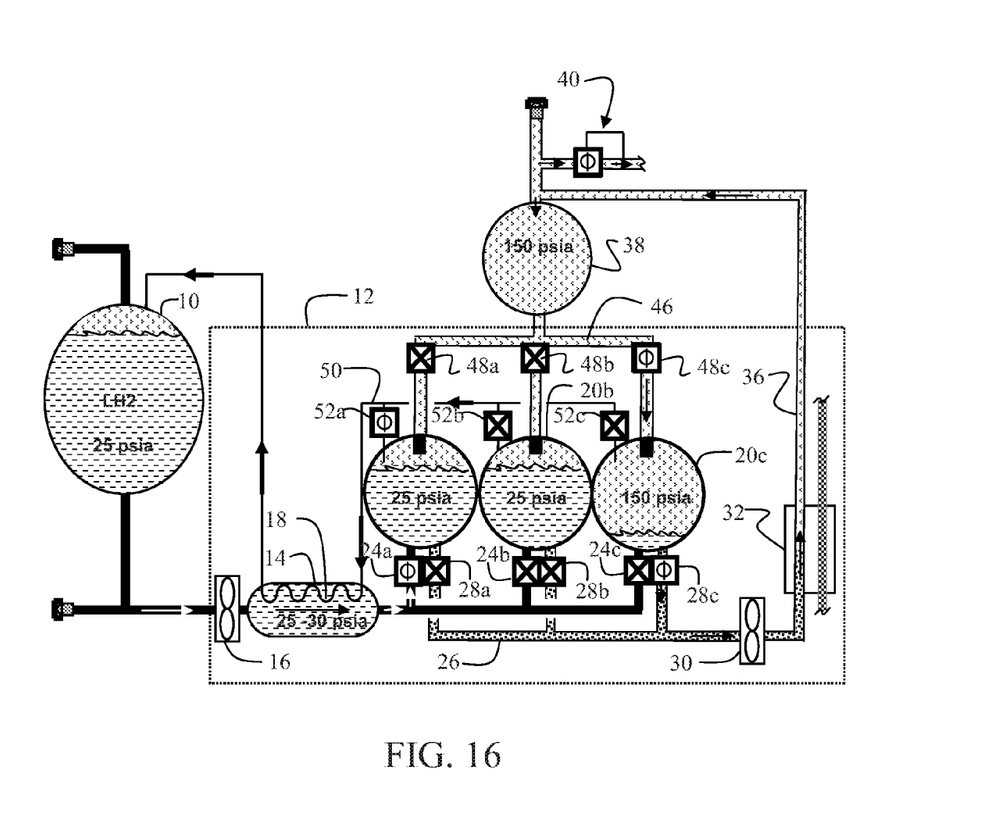

As shown in FIG. 15, pressure recovery to 150 psia is achieved in TDP sphere 20c and accumulator 38. Depressurization of TDP sphere 20a to approximately 25 psia for fill with flow through blow down manifold 50 and heat exchanger 18 and back into the LH2 dewar 10 maintains the slight pressure increase in accumulator and condenser 14 of between 25 to 30 psia. LH2 flow from the dewar assisted by boost pump 16 fills TDP sphere 20a as TDP sphere 20c is being depleted as shown in FIG. 16 placing the system in the condition as previously described with respect to FIG. 8 and the transition between the three TDP spheres rotates for continuous supply of GH2 to accumulator 38 and the engine and or auxiliary systems.

For exemplary embodiments such as a HALE air vehicle application, the LH2 dewar(s) may be one or more 10 foot diameter spherical vacuum jacketed tanks. The TDP spheres are 6 inch diameter stainless steel vacuum jacketed tanks. In alternative embodiments, foam insulation or vacuum jacketing with additional insulation may be employed. The TDP spheres are not intended for long term LH2 storage. The sizing and thermal performance of the TDP spheres is selected to provide rapid cyclical LH2 fill, depletion and transfer to the liquid supply manifold over short time periods with minimal temperature change (i.e. warm-up) between cycles. For this exemplary sizing, cycle time for each TDP sphere is approximately 1 minute at nominal flow rates and may approach 20 seconds an maximum flow conditions. While three TDP spheres have been shown for this embodiment, two spheres or a larger number of spheres may be employed to desired thermal and pumping performance. Additionally, while discharge of one sphere and recharge of a depleted sphere are shown with comparable times in the described embodiment, sequential recharging of multiple spheres may be required to accommodate more rapid depletion times than refill times. Additionally, spherical tanks are employed in the exemplary embodiment, however, cylindrical or conformal tankage may be employed in alternative embodiments. In certain embodiments, a heater assembly 56, as shown in FIG. 1, may be employed in each TDP sphere to maintain a specific working temperature or thermal resistance. Cycle time on the TDP sphere fill and depletion is on the order of 1 minute with the heat exchanger 32 operating at about 2700 lbs/hour hot working fluid flow and about 47 lbs/hr H2 flow. Boost pumps 16 and 30 are electrically driven rotor pumps providing approximately ½ psi head rise for inducing flow of the LH2 in the system to avoid stagnation of flow. Level sensors 58 in each TDP spheres for determination of full and depleted conditions for cycle control as described may be silicon diode point sensors, capacitive sensors or other suitable devices.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A thermodynamic pump system for providing gaseous hydrogen comprising:
   an accumulator for storing pressurized gaseous hydrogen;
   a plurality of liquid hydrogen (LH2) tanks in fluid communication with an outlet of the accumulator and controlled for sequential pressurization; and
   a heat exchanger in fluid communication with the accumulator and in controlled fluid communication with the plurality of tanks for sequentially receiving LH2;
   a supply manifold directly connecting the plurality of tanks to the heat exchanger;
   a pressurization manifold directly connecting the accumulator to the plurality of tanks;
   a fill manifold directly connecting the plurality of tanks to a dewar; and,
   a blow down manifold directly connecting the plurality of tanks to the dewar.

2. The thermodynamic pump defined in claim 1 wherein the supply manifold further comprises a plurality of supply valves for sequential supply of LH2 from the plurality of tanks to the heat exchanger.

3. The thermodynamic pump as defined in claim 2 wherein the pressurization manifold further comprises a plurality of pressurization valves for sequential pressurization of the tanks concurrent with the sequential supply of LH2.

4. The thermodynamic pump as defined in claim 1 wherein the fill manifold further comprises a plurality of fill valves for sequential fill of the tanks with LH2.

5. The thermodynamic pump as defined in claim 4 wherein the blow down manifold further comprises a plurality of depressurization valves for sequential depressurization of gaseous hydrogen (GH2) from the tanks concurrent with the sequential fill of LH2.

6. The thermodynamic pump as defined in claim 5 further comprising an accumulator condenser intermediate the dewar and tanks, said accumulator condenser providing LH2 to the fill manifold and receiving GH2 from the blowdown manifold.

* * * * *